United States Patent [19]
Yoneda et al.

[11] Patent Number: 5,942,292
[45] Date of Patent: Aug. 24, 1999

[54] SPACER FOR LIQUID CRYSTAL DISPLAY AND LIQUID CRYSTAL DISPLAY MADE BY USING THE SAME

[75] Inventors: Yasuhiro Yoneda; Kazuo Kubota; Tetsuo Takano, all of Wakayama, Japan

[73] Assignee: Kao Corporation, Tokyo, Japan

[21] Appl. No.: 08/990,762

[22] Filed: Dec. 15, 1997

[30] Foreign Application Priority Data

Dec. 20, 1996 [JP] Japan .................................. 8-341116

[51] Int. Cl.$^6$ .................................................. G02F 1/1339
[52] U.S. Cl. ............................... 428/1; 428/402; 349/155
[58] Field of Search ....................... 428/1, 402; 349/155; 526/284

[56] References Cited

U.S. PATENT DOCUMENTS

| | | | |
|---|---|---|---|
| 4,336,173 | 6/1982 | Ugelstad | 523/205 |
| 4,459,378 | 7/1984 | Ugelstad | 523/205 |
| 4,795,794 | 1/1989 | Winnik et al. | 526/259 |

FOREIGN PATENT DOCUMENTS

| | | |
|---|---|---|
| 57-24369 | 5/1982 | Japan . |
| 59-64853 | 4/1984 | Japan . |
| 62-86058 | 4/1987 | Japan . |
| 64-81810 | 3/1989 | Japan . |
| 1-144429 | 6/1989 | Japan . |
| 5-301909 | 11/1993 | Japan . |
| 6-256408 | 9/1994 | Japan . |

*Primary Examiner*—Alexander Thomas
*Attorney, Agent, or Firm*—Oblon, Spivak McClelland, Maier & Neustadt, P.C.

[57] ABSTRACT

The present invention provides a spacer for a liquid crystal display which is excellent in light shielding properties, does not suffer from fading even after the lapse of a long period, thus being excellent in long-term reliability, and has satisfactory strengths and a liquid crystal display made by using the spacer. The above spacer is composed of colored fine particles prepared by copolymerizing a polymerizable anthraquinone dye having at least one ethylenically unsaturated bond in the molecule with an ethylenically unsaturated monomer component in an aqueous medium.

8 Claims, 1 Drawing Sheet

SPACER FOR LIQUID CRYSTAL DISPLAY AND LIQUID CRYSTAL DISPLAY MADE BY USING THE SAME

DESCRIPTION

1. Technical Field To Which the Invention Belongs

The present invention relates to a spacer for a liquid crystal display and a liquid crystal display made by using the same, particularly to a spacer for a liquid crystal display which is excellent in light shielding properties, does not suffer from fading even after the lapse of a long period, thus being excellent in high long-term reliability, and has satisfactory strengths, and a liquid crystal display made by using the spacer.

2. Prior Art

In a liquid crystal display, a pair of substrates made of glass or the like each equipped with transparent electrodes and an orientation film are required to be kept facing each other with a constant spacing between them, and fibrous or globular spacers have been used for satisfying this requirement. However, these spacers are made of glass or plastics and these materials are transparent. Therefore, the liquid crystal display panels made by using them have a problem that light comes through the spacer in the dark display areas to result in poor contrast.

In order to solve this problem, there was made a proposal that the coming of light through the spacer is inhibited by using a colored spacer. Up to this time, there have been known processes of preparing a colored spacer by dyeing uncolored particles. For example, JP-A 1-144429 discloses a process of preparing colored fine particles by utilizing an ionic interaction. However, the colored fine particles obtained by this process have disadvantages in that they are easily faded with an alkali or the like and that they are poor in the degree of pigmentation because they are dyed only in the surface layer. Further, JP-A 6-256408 discloses a process for preparing a colored spacer by dissolving an oil-soluble dye in a polymerizable monomer and dispersing the obtained solution in an aqueous medium to conduct polymerization; and JP-A 5-301909 discloses a process for preparing a colored spacer by polymerizing a polymerizable monomer in an aqueous medium containing an anthraquinone dye. However, the fine particles prepared by these processes failed in completely inhibiting the dye molecules from being extracted with or dissolved in a solvent or a liquid crystal or from migrating to it, because the dye molecules are not immobilized on the particles.

For the purpose of inhibiting such extraction or dissolution of a coloring material, there has also been proposed a process of dispersing a pigment in a polymerizable monomer and subjecting the obtained dispersion to polymerization to obtain colored fine particles. According to this process, however, the dispersion of a pigment in a monomer is difficult and a large amount of a pigment must be added in order to attain a satisfactory degree of pigmentation. Therefore, the colored particles thus obtained are problematically poor in strengths, though they are freed from the problem that the coloring material is extracted with or dissolved in a solvent or the like.

As described above, the colored fine particles prepared by the processes of the prior art have problems of insufficient immobilization of a coloring material such as dye, low degree of pigmentation, poor strengths and so on, thus being unsuitable for the use as a spacer for a liquid crystal display.

Although JP-A 59-64853 discloses colored copolymers, it is silent on the application of them to spacers for liquid crystal displays.

Although JP-A 62-86058 discloses the preparation of colored particles from an anthraquinone monomer, it is silent on the application of the particles to a spacer for a liquid crystal display.

DISCLOSURE OF THE INVENTION

The inventors of the present invention have intensively studied to overcome the above disadvantages of the prior art, and as a result of the studies, they have found that a spacer for a liquid crystal display which is excellent in light shielding properties, does not suffer from fading even after the lapse of a long time, thus being excellent in long-term reliability, and has satisfactory strengths can be obtained by immobilizing a dye firmly on fine particles. The present invention has been accomplished on the basis of this finding.

The present invention provides a spacer for a liquid crystal display which is composed of colored fine particles prepared by copolymerizing a polymerizable anthraquinone dye having at least one ethylenically unsaturated bond in the molecule with an ethylenically unsaturated monomer component in an aqueous medium.

It is preferable that two or more polymerizable anthraquinone dyes each having at least one ethylenically unsaturated bond in the molecule be simultaneously used in the preparation of the colored fine particles. Further, the polymerizable anthraquinone dye may have two or more ethylenically unsaturated bonds in the molecule.

In particular, the strengths of the spacer can be improved, when the ethylenically unsaturated monomer component is one containing a crosslinking monomer in an amount of 30% by weight or above based on the whole monomers including the polymerizable anthraquinone dye.

Further, the present invention also provides a liquid crystal display constituted of a pair of substrates each equipped with transparent electrodes and an orientation film which face each other with the above spacer between them.

The present invention provides a liquid crystal display which can give a high-quality display little suffering from flicker and being excellent in contrast by virtue of the improvement of the spacer in the coefficient of variation and modulus in compression.

Namely, the present invention provides a spacer for a liquid crystal display which is composed of colored fine particles prepared by copolymerizing a polymerizable anthraquinone dye having at least one ethylenically unsaturated bond in the molecule with an ethylenically unsaturated monomer component in an aqueous medium, and a liquid crystal display made by using this spacer.

The invention provides a process for producing a liquid crystal display, which comprises the steps of obtaining the above described colored fine particles, placing a tranparent electrode and an orientation film to face to each other and provide a pair of substrates and putting said colored fine particles as a spacer beween the substrates.

The invention provides also a method for improving the quality of images provided on a liquid crystal display, which comprises the steps of using the above described colored fine particles as a spacer between a pair of substrates of a tranparent electrode and an orientation film facing to each other.

MODES FOR CARRYING OUT THE INVENTION

The modes for carrying out the present invention will now be described in detail.

In the present invention, a polymerizable anthraquinone dye having at least one ethylenically unsaturated bond in the molecule is used in the preparation of the colored particles, and examples of the dye include those described in the following items ①to ④, which may be used each alone or as a mixture of two or more of them.

①: a product of reaction of an oil-soluble anthraquinone dye having in the molecule at least one member selected from the group consisting of hydroxyl (including alcoholic and phenolic ones, the same applies hereinafter), amino and monoalkylamino groups with an ethylenically unsaturated carboxylic acid chloride; ②: a product of reaction of an oil-soluble anthraquinone dye having in the molecule at least one member selected from the group consisting of hydroxyl, amino, monoalkylamino and carboxyl groups with an ethylenically unsaturated epoxy compound; ③: a product of reaction of an oil-soluble anthraquinone dye having in the molecule at least one member selected from the group consisting of hydroxyl, amino, monoalkylamino and carboxyl groups with an ethylenically unsaturated isocyanate compound; and ④: a product of reaction of an oil-soluble anthraquinone dye represented by the general formula (I) with an ethylenically unsaturated methylol compound.

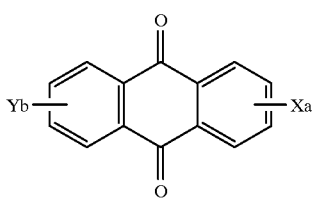

(I)

[wherein X and Y are each —OH; a is an integer of 2 to 4; and b is an integer of 0 to 4 (with the proviso that a and b must satisfy the relationship: $a+b \leq 7$)].

The polymerizable anthraquinone dyes disclosed in the above items ① to ④ will now be described.

As described above, an oil-soluble anthraquinone dye having in the molecule at least one member selected from the group consisting of hydroxyl, amino and monoalkylamino groups is used in preparing the polymerizable anthraquinone dye ①, and such an oil-soluble anthraquinone dye includes those characterized by having at least one hydroxyl group in the molecule, for example, 1,2-dihydroxyanthraquinone, 1,4-dihydroxy-anthraquinone, 1,5-dihydroxyanthraquinone, 1,8-dihydroxyanthraquinone, 1,2,3-trihydroxyanthraquinone, 1,2,4-trihydroxyanthraquinone, 1,2,6-trihydroxyanthraquinone, 1,2,7-trihydroxyanthraquinone, 1,2,5,8-tetrahydroxyanthraquinone, 1,3,5,7-tetrahydroxyanthraquinone, 1,2,3,4-tetrahydroxyanthraquinone and 1,5-dihydroxy-4,8-di(benzoylamino)anthraquinone; those characterized by having at least one member selected from among amino and monoalkylamino groups in the molecule, for example, 1-amino-2-methylanthraquinone, 1,2-diaminoanthraquinone, 1,4-diaminoanthraquinone, 1,4-di(methylamino)anthraquinone, 1,4-di(ethylamino)-anthraquinone, 1,4-di(n-butylamino)anthraquinone, 1,4-di(phenylamino)anthraquinone, 1,4-di(p-toluylamino)anthraquinone, 1,4-diamino-2-methoxy-anthraquinone, 1,4-diamino-2,3-dichloroanthraquinone, 1,4-diamino-2,3-dicyanoanthraquinone, 1,4-diamino-2,3-diphenoxyanthraquinone, 1,5-diaminoanthraquinone, 1,5-di(methylamino)anthraquinone, 1,5-di(ethylamino)-anthraquinone, 1,5-di(n-butylamino) anthraquinone, 1,5-di(phenylamino)anthraquinone, 1,5-di(p-tolylamino)anthraquinone, 1,4,5,8-tetraaminoanthraquinone and 1,4-di(benzoylamino)-2-aminoanthraquinone; and those characterized by having both at least one hydroxyl group and at least one member selected from among amino and monoalkylamino groups in the molecule, for example, 1-amino-4-hydroxyanthraquinone, 1-methylamino-4-hydroxyanthraquinone, 1-ethylamino-4-hydroxyanthraquinone, 1-n-butylamino-4-hydroxyanthraquinone, 1-amino-2-methoxy-4-hydroxyanthraquinone, 1-amino-2-methoxy-4-hydroxyanthraquinone, 1-amino-2-phenoxy-4-hydroxyanthraquinone, 1-amino-2-bromo-4-hydroxyanthraquinone, 1-hydroxy-4-(2-hydroxyethylamino)anthraquinone, 1,4-di(2-hydroxyethylamino)-5,8-dihydroxyanthraquinone, 1,5-diamino-4,8-dihydroxyanthraquinone, 1,5-diamino-4,8-dihydroxy-3-bromoanthraquinone, 1-methylamino-4-(2-hydroxyethylamino)anthraquinone, 1-methylamino-4-{2-(2-hydroxyethoxy)ethylamino}anthraquinone, 1,4-di(2-hydroxy-ethylamino)anthraquinone, 1,4-di(2,3-dihydroxypropylamino)anthraquinone, and 1,4-di{2-(2-hydroxyethoxy)ethylamino}anthraquinone.

Further, an oil-soluble anthraquinone dye having in the molecule at least one member selected from the group consisting of hydroxyl, amino, monoalkylamino and carboxyl groups is used in preparing the polymerizable anthraquinone dye ②. Such an oil-soluble anthraquinone dye includes those characterized by having both at least one hydroxyl group and at least one carboxyl group in the molecule, for example, 1,2-dihydroxy-3-dicarboxymethylaminomethylanthraquinone and carminic acid; and those characterized by having both at least one member selected from among amino and monoalkylamino groups and at least one carboxyl group in the molecule, for example, 1,4-di(2-carboxymethoxyethyl- amino)anthraquinone, in addition to the oil-soluble anthraquinone dyes described above for the polymerizable anthraquinone dye ①, i.e., the above-described oil-soluble anthraquinone dyes characterized by having at least one hydroxyl group in the molecules, the above-described ones characterized by having at least one member selected from among amino and monoalkylamino groups in the molecule, and the above-described ones characterized by having both at least one hydroxyl group and at least one member selected from among amino and monoalkylamino groups in the molecule.

Furthermore, an oil-soluble anthraquinone dye having in the molecule at least one member selected from the group consisting of hydroxyl, amino, monoalkylamino and carboxyl groups is used in preparing the polymerizable anthraquinone dye ③. Such an oil-soluble anthraquinone dye includes those described above for the polymerizable anthraquinone dye ①, i.e., the above-described oil-soluble anthraquinone dyes characterized by having at least one hydroxyl group in the molecule, the above-described ones characterized by having at least one member selected from among amino and monoalkylamino groups in the molecule, and the above-described ones characterized by having both at least one hydroxyl group and at least one member selected from among amino and monoalkylamino groups in the molecule; and those described above for the polymerizable anthraquinone dye ②, i.e., the above-described oil-soluble anthraquinone dyes characterized by having both at least one hydroxyl group and at least one carboxyl group in the molecule, and the above-described ones characterized by having both at least one member selected from among amino and monoalkylamino groups and at least one carboxyl group in the molecule.

As described above, an oil-soluble anthraquinone dye represented by the general formula (I) is used in preparing the poolymerizable anthraquinone dye ④, and examples of such an oil-soluble anthraquinone dye include 1,2-dihydroxyanthraquinone, 1,4-dihydroxy-anthraquinone, 1,2,3-trihydroxyanthraquinone, 1,2,4-trihydroxyanthraquinone, 1,2,6-trihydroxyanthraquinone, 1,2,7-trihydroxyanthraquinone, 1,2,5,8-tetrahydroxy-anthraquinone, 1,3,5,7-tetrahydroxyanthraquinone and 1,2,3,4-tetrahydroxyanthraquinone.

The ethylenically unsaturated carboxylic acid chloride to be used in the preparation of the polymerizable anthraquinone dye ① includes acryloyl chloride, methacryloyl chcloride, crotonoyl chloride, isocrotonoyl chloride, p-vinylbenzoyl chloride and so on.

The ethylenically unsaturated epoxy compound to be used in the preparation of the polymerizable anthraquinone dye ② includes glycidyl acrylate, glycidyl methacrylate, glycidyl crotonate, allyl glycidyl ether, methyl glycidyl itaconate, glycidyl p-vinylbenzoate, N-(p-vinylphenyl) glycidylurethane, glycidyl vinylsulfonate and so on.

The ehtylenically unsaturated isocyanate compound to be used in the preparation of the polymerizable anthraquinone dye ③ includes vinyl isocyanate, isopropenyl isocyanate, p-vinylphenyl isocyanate and so on.

The ethylenically unsaturated methylol compound to be used in the preparation of the polymerizable anthraquinone dye ④ includes N-methylolacrylamide, N-methylolmethacrylamide and so on.

Detailed description will now be made on the preparation of the polymerizable anthraquinone dyes ① to ④ from the above oil-soluble anthraquinone dyes and ethylenically unsaturated compounds.

The polymerizable anthraquinone dye ① is prepared by reacting an oil-soluble anthraquinone dye having at least one member selected from the group consisting of hydroxyl, amino and monoalkylamino groups in the molecule with an ethylenically unsaturated carboxylic acid chloride.

More precisely, the above oil-soluble anthraquinone dye is dissolved in an organic solvent, followed by the addition of an acid scavenger. Examples of the solvent to be used in this case include ethers such as diethyl ether and tetrahydrofuran and halogenated solvents such as chloroform and dichloromethane, while those of the acid scavenger include organic amines such as triethylamine, pyridine and dimethylaminopyridine. If necessary, a polymerization inhibitor selected from among methoquinone, hydroquinone, t-butylcatechol and so on may be added to the solution. Then, an ethylenically unsaturated carboxylic acid chloride is dropped into the above dye solution containing an acid scavenger, while the temperature rise of the solution is inhibited by cooling. The amount of the carboxylic acid chloride and the temperature and time of reaction to be employed after the completion of the dropping may suitably be selected in accordance with the reactivity and the number of unsaturated bonds to be introduced.

The polymerizable anthraquinone dye ② is prepared by reacting an oil-soluble anthraquinone dye having at least one member selected from the group consisting of hydroxyl, amino, monoalkylamino and carboxyl groups in the molecule with an ethylenically unsaturated epoxy compound.

More precisely, the above oil-soluble anthraquinone dye is reacted with an ethylenically unsaturated epoxy compound either in a state dissolved in an organic solvent or without any solvent, with the organic solvent being selected from among alcohols, ethers, halogenated solvents, dimethylformamide (DMF), dimethyl sulfoxide (DMSO) and so on. In this case, a polymerization inhibitor such as methoquinone, hydroquinone or t-butylcatechol may be used at need. The amount of the epoxy compound and the temperature and time of reaction may suitably be selected in accordance with the reactivity and the number of unsaturated bonds to be introduced. If necessary, a catalyst may be used, with the catalyst being selected from among tertiary amines such as pyridine, dimethylaniline and triethylamine and inorganic bases such as sodium hydroxide and potassium hydroxide.

The polymerizable anthraquinone dye ③ is prepared by reacting an oil-soluble anthraquinone dye having at least one member selected from the group consisting of hydroxyl, amino, monoalkylamino and carboxyl groups in the molecule with an ethylenically unsaturated isocyanate compound.

More precisely, the above oil-soluble anthraquinone dye is dissolved in an organic solvent selected from among ethers such as diethyl ether and tetrahydrofuran, halogenated solvents such as chloroform and dichloromethane, and aromatic solvents such as toluene. If necessary, a polymerization inhibitor such as methoquinone, hydroquinone or t-butylcatechol may be added to the solution. Then, an ethylenically unsaturated isocyanate compound is dropped into the dye solution prepared above, while the temperature rise of the solution is inhibited by cooling. The amount of the isocyanate compound and the temperature and time of reaction to be employed after the completion of the dropping may suitably be selected in accordance with the reactivity and the number of unsaturated bonds to be introduced.

The polymerizable anthraquinone dye ④ is prepared by reacting an oil-soluble anthraquinone dye represented by the general formula (I) with an ethylenically unsaturated methylol compound.

More precisely, the oil-soluble anthraquinone dye is dissolved in concentrated sulfuric acid, followed by cooling. An ethylenically unsaturated methylol compound is added to the resulting solution in portions, while the temperature rise of the solution is inhibited by cooling. Thus, the above reaction is conducted. The amount of the methylol compound and the temperature and time of reaction may suitably be selected in accordance with the reactivity and the number of unsaturated bonds to be introduced.

The colored fine particles constituting the spacer of the present invention can be prepared by copolymerizing the thus-prepared polymerizable anthraquinone dye having at least one ethylenically unsaturated bond in the molecule with an ethylenically unsaturated monomer component in an aqueous medium in the presence of a radical polymerization initiator.

The ethylenically unsaturated monomer component to be copolymerized with the polymerizable anthraquinone dye includes crosslinking monomers and non-crosslinking monomers.

The crosslinking monomer to be used in the present invention is not particularly limited, but may be any radical-polymerizable one having two or more ethylenically unsaturated bonds. Examples thereof include vinyl compounds such as divinylbenzene, 1,4-divinyloxybutane and divinyl sulfone; allyl compounds such as dially phthalate, diallylacrylamide, trially (iso)cyanurate and triallyl trimellitate; (poly)alkylene glycol di(meth)acrylates such as (poly) ethylene glycol di(meth)acrylate and (poly)propylene glycol di(meth)acrylate; pentaerythritol tetra(meth)acrylate, pentaerythritol tri(meth)acrylate, pentaerythritol di(meth) acrylate, trimethylolpropane tri(meth)acrylate, dipentaerythritol hexa(meth)acrylate, dipentaerythritol penta-(meth) acrylate and glycerol tri(meth)acrylate. These crosslinking monomers may be used each alone or as a mixture of two or more of them.

The non-crosslinking monomer to be copolymerized is any radical-polymerizable one and examples thereof include styrenic monomers such as styrene, p- and m-methylstyrenes, p- and m-ethylstyrenes, p- and m-chlorostyrenes, p- and m-chloromethylstyrenes, styrene-sulfonic acid, p- and m-t-butoxystyrenes, α-methyl-p-t-amyloxystyrene and p-t-amyloxystyrene; (meth)acrylic acid esters such as methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth) acrylate, n-octyl (meth)acrylate, lauryl (meth)acrylate, stearyl (meth)acrylate, 2-hydroxyethyl (meth)acrylate, polyethylene glycol (meth)acrylate, methoxypolyethylene glycol (meth)acrylate, glycidyl (meth)acrylate, dimethylaminoethyl (meth)acrylate and diethylaminoethyl (meth)acrylate; vinyl esters such as vinyl acetate, vinyl propionate and vinyl butyrate; vinyl ethers such as vinyl methyl ether, vinyl ethyl ether and vinyl isobutyl ether; allyl ethers such as allyl ethyl ether, allyl butyl ether and allyl glycidyl ether; unsaturated carboxylic acids such as (meth)acrylic acid and maleic acid; N-alkyl(meth)-acrylamides such as N-methyl(meth) acrylamide and N-ethyl(meth)acrylamide; and nitriles such as (meth)acrylonitrile. These non-crosslinking monomers may be used each alone or as a mixture of two or more of them.

With respect to the mixing ratio of the crosslinking monomer to the non-crosslinking monomer, it is desirable that the crosslinking monomer is used in an amount of 5% by weight or above, more desirably 30% by weight or above, most desirably 50% by weight or above, based on the whole monomers. When the amount of the crosslinking monomer is less than 5% by weight, the resulting colored fine particles will be poor in strengths, so that a liquid crystal display panel containing the particles built therein as the spacer will suffer from color shading.

Although the above polymerizable anthraquinone dyes can be used each alone or as a mixture of two or more of them in preparing the colored fine particles according to the present invention, it is preferable from the standpoints of effectively inhibiting the coming of light through spacer particles and thereby attaining excellent light shielding properties that two or more of the polymerizable anthraquinone dyes be combined so as to form a black dye. Further, the use of a polymerizable anthraquinone dye having two or more ethylenically unsaturated bonds in the molecule is preferable for inhibiting the strengths of the spacer from lowering and for more completely inhibiting the extraction or dissolution of the dye which is causative of the contamination of liquid crystals. The amount of the polymerizable annthraquinone dye to be used in preparing the colored fine particles is preferably 3% by weight or above, still preferably 5 to 50% by weight based on the whole monomers, because the use of the dye in such an amount can inhibit the coming of light through the spacer more effectively.

The radical polymerization initiator to be used in the present invention may be any conventional oil-soluble one. Examples of such an initiator include peroxides such as benzoyl peroxide, lauroyl peroxide, o-chlorobenzoyl peroxide, o-methoxybenzoyl peroxide, t-butyl peroxy-2-ethylhexanoate, t-butyl peroxyisobutyrate and 1,1,3-3-tetramethylbutyl peroxy-2-ethylhexanoate and azo compounds such as 2,2'-azobisisobutyronitrile, 2,2'-azobis(2-methylbutyro-nitrile) and 2,2'-azobis(2,4-dimethylvaleronitrile). The use of a peroxide-type initiator is preferable in respect of the strengths of the spacer. It is generally preferable to use the initiator in an amount of 0.1 to 10 parts by weight per 100 parts by weight of the monomers to be polymerized.

The polymerization process to be employed in preparing the spacer according to the present invention includes seed polymerization, suspension polymerization, dispersion polymerization and so on. In particular, seed polymerization is advantageous in that it can give particles having an extremely narrow particle diameter distribution in a high yield and that the diameter of the particles can easily be controlled, thus being suitable for the preparation of the spacer. For example, seed polymerization processes disclosed in JP-A 1-81810 and JP-B 57-24369 can be employed in the present invention. Precisely, the fine particles according to the present invention can be prepared by making the polymerizable anthraquinone dye and an ethylenically unsaturated monomer component absorbed into seed polymer particles dispersed in an aqueous medium and subjecting the resulting system to polymerization in the presence of a polymerization initiator. When the preparation of the fine particles is to be conducted by suspension polymerization, it is preferable to conduct it in an aqueous medium. Precisely, it can be conducted conventionally by subjecting a solution prepared by dissolving the polymerizable anthraquinone dye and the initiator in the monomer component to polymerization in an aqueous medium in the presence of a dispersion stabilizer under stirring at a temperature of 25 to 100° C., preferably 50 to 90° C. Examples of the dispersion stabilizer include water-soluble polymers such as gelatin, starch, hydroxyethylcellulose, carboxymethylcellulose, polyvinylpyrrolidone, polyvinyl alkyl ethers and polyvinyl alcohol and difficultly soluble inorganic salts such as barium sulfate, calcium sulfate, barium carbonate, calcium carbonate, magnesium carbonate and calcium phosphate. Various surfactants may be added to further enhance the dispersion stability, and examples of such surfactants include sodium lauryl sulfate, sodium laurylbenzenesulfonate, and sodium salt of sulfate of polyoxyethylene lauryl ether In the present invention, the colored fine particles thus prepared are used as the spacer. It is generally preferable that the particles have a mean particle diameter of about 1 to 20 μm. With respect to the particle diameter distribution of the particles, it is preferable that the standard deviation (coefficient of variation) of the particle diameter distribution be at most 20% of the mean particle diameter, still preferably at most 10% thereof. When the spacer has too wide a particle diameter distribution, non-uniformity will occur in the cell gap, and in particular, particles having diameters smaller than the cell gap will move in the space of the panel to gather near the electrodes disadvantageously.

BRIEF DESCRIPTION OF DRAWING

As shown in FIG. 1, the liquid crystal display of the present invention is produced by arranging two transparent substrates 1 which each have transparent electrodes 2 formed thereon in a predetermined pattern and are each provided with an orientation film 3 covering the electrodes in a state facing each other with the above spacer 5 between them. In FIG. 1, a liquid crystal layer 6 is supported by a seal 4 made from an epoxy resin or the like. Numeral 7 refers to a pair of polarizing plates set on the outside surfaces of the substrates respectively.

Figure 1:
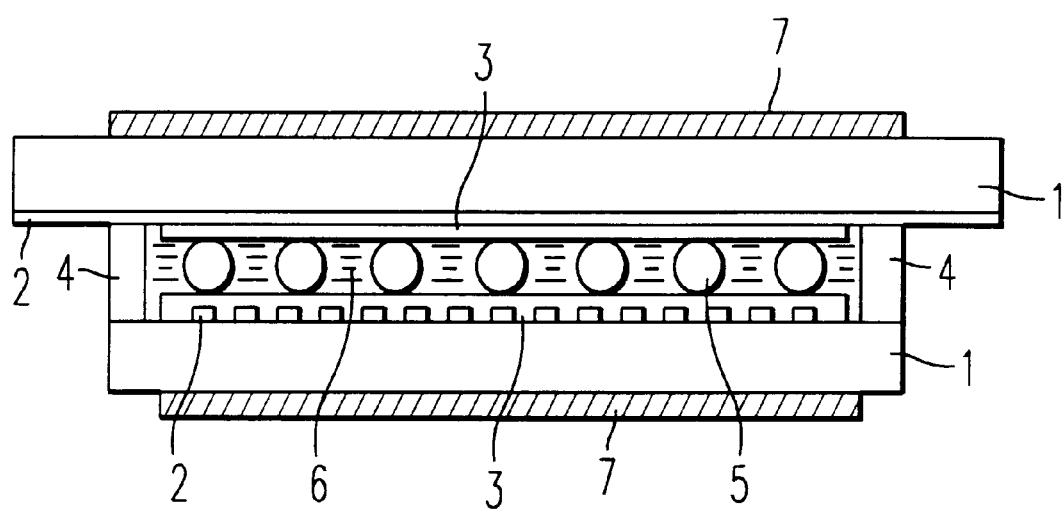
FIG. 1 is a sectional view of an example of the liquid crystal display of the present invention, wherein 1: substrate, 2: transparent electrode, 3: orientation film, 4: seal, 5: spacer, 6: liquid crystal layer, 7: polarizing plate.

The spacer of the present invention is prepared by using a polymerizable anthraquinone dye, so that the dye is firmly immobilized on the spacer particles through covalent bonds. Accordingly, the spacer is free from fading and is excellent in light-shielding properties. Further, it little suffers from the extraction or dissolution of the dye even after the lapse of a long period, thus being excellent in reliability and suitable for liquid crystal displays.

EXAMPLE

The present invention will now be described in more detail by referring to the following Synthesis Examples for the polymerizable anthraquinone dyes and Examples of the present invention, though the present invention is not limited by them.

In the Synthesis Examples and Examples, all parts and percentages are by weight unless otherwise noted.

In general, the strength of a spacer particle is expressed in modulus in compression found when the diameter of the particle is deformed by 10% by applying compression toward the center of the particle (the modulus in compression being hereinafter referred to merely as "10% modulus in compression"). In the following Examples, each spacer was examined for 10% modulus in compression by the following method.

<Method of measuring 10% modulus in compression>

Compression was applied toward the center of one sample particle put on a test plane by the use of a Shimadzu powder compression tester (mfd. by Shimadzu Corporation, PCT-200) to measure the compression-deflection relationship. Thus, the compression at 10% deflection was determined. The 10% modulus in compression was calculated from the compression at 10% deflection according to the following formula. Three particles were examined by the above method and the three values were averaged. The average value thus determined was taken as the 10% modulus in compression. The measurement was conducted at room temperature.

$$E = \frac{3 \times F \times (1 - k^2)}{\sqrt{2} \times S^{1.5} \times \sqrt{R}}$$

wherein E: 10% modulus in compression (kg/mm$^2$)
F: compression (kg)
k: Poisson's ratio of particle (constant: 0.38)
S: compression deflection
R: radius of particle (mm)

Polymerizable anthraquinone dyes A to F are prepared in Synthesis Examples 1 to 6, and polystyrene is prepared in Referential Example, while preparation of colored fine particles by the use of the dyes is conducted in Examples 1 to 8. Dyes A, B and C obtained in Synthesis Examples 1, 2 and 3 respectively correspond to the above-mentioned polymerizable anthraquinone dyes ①, and dyes D, E and F obtained in Synthesis Examples 4, 5 and 6 respectively correspond to the above-mentioned polymerizable anthraquinone dyes ②, ③ and ④, respectively.

Synthesis Example 1

Thirty parts of 1-(2-hydroxyethylamino)-4-hydroxy-anthraquinone, 20 parts of triethylamine and 0.005 part of methoquinone were dissolved in 800 parts of dried chloroform and the obtained solution was cooled with ice in a nitrogen atmosphere. Then, 15 parts of methacryloyl chloride was dropped into the resulting solution. After the completion of the dropping, the obtained mixture was stirred at room temperature for 8 hours. The reaction mixture thus obtained was washed with water, dried and distilled to remove the solvent. Thus, a purple polymerizable anthraquinone dye A was obtained. The anthraquinone dye A is represented by the below chemical formula (II).

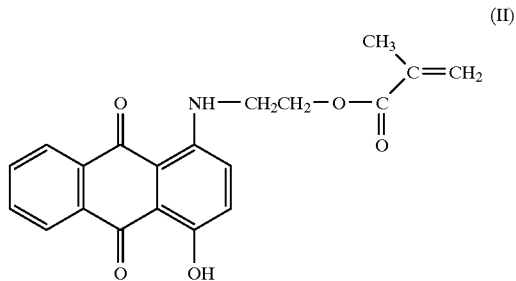

(II)

Synthesis Example 2

Forty parts of 1,4-di{2-(2-hydroxyethoxy)ethyl-amino}anthraquinone, 45 parts of triethylamine and 0.01 part of methoquinone were dissolved in 800 parts of dried chloroform and the obtained solution was cooled with ice in a nitrogen atmosphere. Then, 30 parts of methacryloyl chloride was dropped into the resulting solution. After the completion of the dropping, the obtained mixture was stirred at room temperature for 8 hours. The reaction mixture thus obtained was washed with water, dried and distilled to remove the solvent. Thus, a blue polymerizable anthraquinone dye B was obtained. The anthraquinone dye B is represented by the below chemical formula (III).

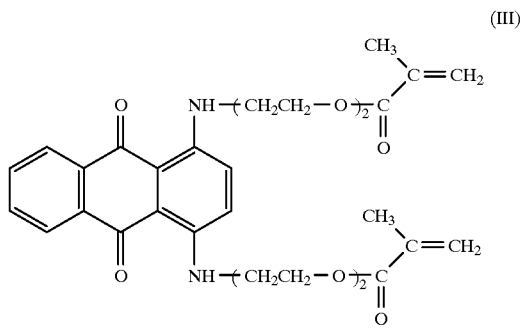

(III)

Synthesis Example 3

Twenty-five parts of 1,2,4-trihydroxy-anthraquinone, 45 parts of dimethylaminopyridine and 0.01 part of methoquinone were dissolved in 1000 parts of dried dichloromethane and the obtained solution was cooled with ice in a nitrogen atmosphere. Then, 25 parts of acryloyl chloride was dropped into the resulting solution. After the completion of the dropping, the obtained mixture was stirred under reflux for 8 hours. The reaction mixture thus obtained was washed with water, dried and distilled to remove the solvent. Thus, a yellow polymerizable anthraquinone dye C was obtained. The anthraquinone dye C is represented by the below chemical formula (IV).

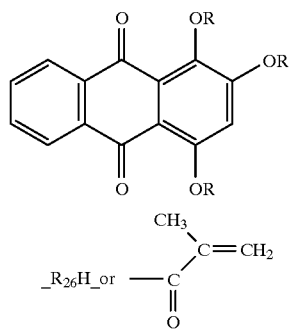

(A proviso; At least one of Rs methacrylate group.)

Synthesis Example 4

A solution prepared by adding 0.02 part of methoquinone to a mixture comprising 24 parts of 1,4-diaminoanthraquinone and 70 parts of glycidyl methacrylate and dissolving the obtained mixture in 1000 parts of methanol was stirred under reflux for 8 hours. After the completion of the reaction, the reaction mixture was distilled to remove the methanol. The obtained viscous solid was subjected to extractive washing with petroleum ether to give a blue polymerizable anthraquinone dye D. The anthraquinone dye D is represented by the below chemical formula (V).

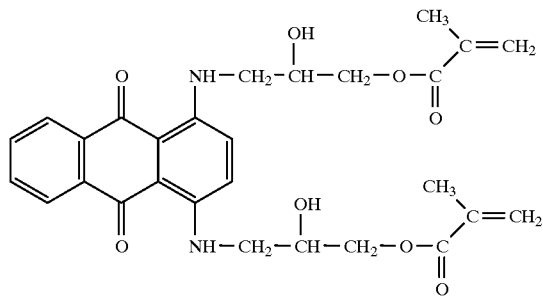

Synthesis Example 5

A solution prepared by adding 0.005 part of methoquinone to 24 parts of 1-amino-4-hydroxy-anthraquinone and dissolving the obtained mixture in 900 parts of dried chloroform was cooled with ice in a nitrogen atmosphere. Then, 18 parts of isopropenyl isocyanate was dropped into the resulting solution. After the completion of the dropping, the obtained mixture was stirred under cooling with ice for 3 hours to complete a reaction. Then, the obtained reaction mixture was freed from the chloroform by distillation and recrystallized from ethanol to give a yellow polymerizable anthraquinone dye E. The anthraquinone dye E is represented by the below chemical formula (VI).

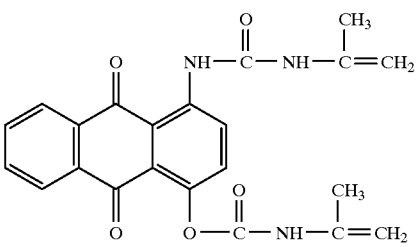

Synthesis Example 6

Twenty-five parts of 1,2,4-trihydroxy-anthraquinone was added to 45 parts of concentrated sulfuric acid. The obtained mixture was cooled with ice in a nitrogen atmosphere. Then, 15 parts of N-methylolacrylamide was added to the resulting mixture in portions. After the completion of the addition, the obtained mixture was stirred at room temperature for 24 hours and poured over a large amount of ice. The precipitate thus formed was recrystallized from ethanol to give a reddish-brown polymerizable anthraquinone dye F. The anthraquinone dye F is represented by the below chemical formula (VII).

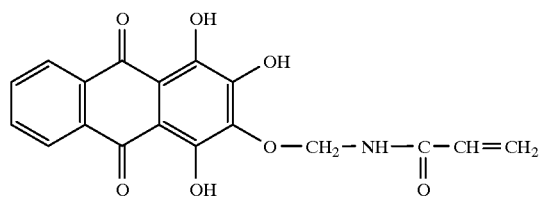

Referential Example

A solution prepared by dissolving 7.2 parts of polyvinylpyrrolidone (M.W.: 40000), 2 parts of Aerosol OT (a product of Wako Pure Chemical Industries, Ltd.) and 0.5 part of azobisisobutyronitrile in 340 parts of ethanol was heated to 70° C. under stirring in a nitrogen atmosphere, followed by the addition of 50 parts of styrene. The obtained mixture was kept at that temperature for 24 hours to give polymer particles. The particles had a mean particle diameter of 1.83 μm and a standard deviation of particle diameter distribution of 0.06 μm.

Example 1

Two hundred and fifty parts of ion-exchanged water and 0.13 part of sodium lauryl sulfate were added to 2.0 parts of the monodisperse polystyrene seed particles (dry product) prepared in Referential Example to form a homogenous dispersion. Separately, a solution prepared by mixing a monomer mixture comprising 80 parts of divinylbenzene (purity: 81%, a product of Nippon Steel Chemical Co., Ltd., DVB-810) and 20 parts of acrylonitrile with 10 parts of polymerizable anthraquinone dye A, 50 parts of methyl ethyl ketone and 4.0 parts of 1,1,3,3-tetramethylbutyl peroxy-2-ethylhexanoate ("Perocta O"; a product of Nippon Oil and Fats Co., Ltd.) was mixed with 500 parts of ion-exchanged water and 0.7 part of sodium lauryl sulfate, and the obtained mixture was sonicated to give an emulsion. This emulsion was added to the seed particle dispersion prepared above and the obtained mixture was stirred at 40° C. for 5 hours. The monomers were absorbed by the seed particles. Three hundred parts of a 4% aqueous solution of polyvinyl alcohol (GH-17, degree of saponification: 86.5 to 89 mole %, a product of The Nippon Synthetic Chemical Industry, Co., Ltd.) was added to the dispersion thus obtained, and the obtained mixture was stirred at 80° C. in a nitrogen atmosphere for 14 hours to conduct polymerization. After the completion of the polymerization, the fine polymer particles formed were washed with ion-exchanged water and a solvent, isolated and dried to give purple uniform-diameter fine particles. The particles had a mean particle diameter of 6.4 μm, a coefficient of variation of 2.9% and a 10% modulus in compression of 330 kg/mm$^2$ (on an average).

The observation of the colored fine particles thus prepared under a microscope of 400 magnifications revealed that they were colored intensely and had high light shielding properties. Although, the colored fine particles were dispersed in chloroform and sonicated for 60 minutes, no polymerizable anthraquinone dye was extracted with the chloroform at all.

A super-twisted liquid crystal display having a cell size of about 10 inches (in terms of diagonal) and a number of dots of 640×480 was made by using the colored fine particles as the spacer. A scanning voltage was applied to the display device and the displaying characteristics were observed. The device gave a high-quality display which little suffered from flicker and was excellent in contrast.

Example 2

Seed polymerization was conducted in the same manner as that of Example 1 except that 14 parts of polymerizable anthraquinone dye B was used. Blue fine particles were obtained, which had a mean particle diameter of 6.2 μm, a coefficient of variation of 3.0% and a 10% modulus in compression of 390 kg/mm$^2$ (on an average).

The observation of the colored fine particles thus prepared under a microscope of 400 magnifications revealed that they were colored intensely and had high light shielding properties. Although the colored fine particles were dispersed in chloroform and sonicated for 60 minutes, no polymerizable anthraquinone dye was extracted with the chloroform at all.

In a similar manner to that of Example 1, a liquid crystal display was made by using the colored fine particles as the spacer. A scanning voltage was applied to the display device and the displaying characteristics were observed. The device gave a high-quality display which little suffered from flicker and was excellent in contrast.

Example 3

A solution prepared by mixing 100 parts of divinylbenzene with 7.5 parts of polymerizable anthraquinone dye C and 5.0 parts of benzoyl peroxide (a product of Nippon Oil and Fats Co., Ltd., "Nyper BW") was microdispersed in 800 parts of a 5.0% aqueous solution of polyvinyl alcohol. The obtained dispersion was kept at 80° C. in a nitrogen stream under stirring for 12 hours to conduct polymerization. After the completion of the polymerization, the obtained polymer particles were washed with ion-exchanged water and a solvent, classified and dried to give yellow fine particles having a mean particle diameter of 7.7 μ, a coefficient of variation of 5.2% and a 10% modulus in compression of 380 kg/mm$^2$ (on an average).

The observation of the colored fine particles thus prepared under a microscope of 400 magnifications revealed that they were colored intensely and had high light shielding properties. Although the colored fine particles were dispersed in chloroform and sonicated for 60 minutes, no polymerizable anthraquinone dye was extracted with the chloroform at all.

In a similar manner to that of Example 1, a liquid crystal display was made by using the colored fine particles as the spacer. A scanning voltage was applied to the display device and the displaying characteristics were observed. The device gave a high-quality display which little suffered from flicker and was excellent in contrast.

Example 4

One hundred and fifty parts of ion-exchanged water, 0.5 part of sodium lauryl sulfate and 10 parts of acetone were added to 1.5 parts of the monodisperse polystyrene seed particles (dry product) prepared in Referential Example to obtain a homogenous dispersion. Separately, 4.0 parts of t-hexyl peroxy-2-ethylhexanoate (a product of Nippon Oil and Fats Co., Ltd., "Perhexyl O") and 0.5 part of sodium lauryl sulfate were added to 130 parts of water and the obtained mixture was emulsified by sonication. The emulsion thus prepared was added to the seed particle dispersion prepared above, and the obtained mixture was stirred at 30° C. for 12 hours and distilled to remove the acetone.

Separately, 600 parts of ion-exchanged water and 2.0 parts of sodium lauryl sulfate were added to a solution prepared by adding 10 parts of polymerizable anthraquinone dye D to a monomer mixture comprising 80 parts of divinylbenzene (purity: 81%) and 40 parts of ethylene glycol dimethacrylate ("NK Ester 1G", a product of Shin-Nakamura Kagaku Kogyo K.K.), and the obtained mixture was emulsified by sonication. The monomer dispersion thus obtained was added to the above acetone-free seed particle dispersion, and the obtained mixture was stirred at 40° C. for 3 hours. Then, 300 parts of a 3% aqueous solution of polyvinyl alcohol ("GH-17", degree of saponification: 86.5 to 89 mole %, a product of The Nippon Synthetic Chemical Industry, Co., Ltd.) was added to the dispersion thus obtained, and the obtained mixture was stirred at 80° C. in a nitrogen stream for 12 hours to conduct polymerization. The fine polymer particles thus obtained were washed with ion-exchanged water and a solvent, isolated and dried to give blue fine particles. The particles had a mean particle diameter of 7.4 μm, a coefficient of variation of 2.7% and a 10% modulus in compression of 380 kg/mm$^2$ (on an average).

The observation of the colored fine particles thus prepared under a microscope of 400 magnifications revealed that they were colored intensely and had high light shielding properties. Although the colored fine particles were dispersed in chloroform and sonicated for 60 minutes, no polymerizable anthraquinone dye was extracted with the chloroform at all.

In a similar manner to that of Example 1, a liquid crystal display was made by using the colored fine particles as the spacer. A scanning voltage was applied to the display device and the displaying characteristics were observed. The device gave a high-quality display which little suffered from flicker and was excellent in contrast.

Example 5

Seed polymerization was conducted in the same manner as that of Example 1 except that 70 parts of divinylbenzene, 30 parts of pentaerythritol triacrylate (NK Ester A-TMM-3, a product of Shin-Nakamura Kagaku Kogyo K.K.) and 5.0 parts of polymerizable anthraquinone dye E were used as the monomers. Yellow fine particles were obtained, which had a mean particle diameter of 6.6 μm, a coefficient of variation 3.0 of % and a 10% modulus in compression of 370 kg/mm² (on an average).

The observation of the colored fine particles thus prepared under a microscope of 400 magnifications revealed that they were colored intensely and had high light shielding properties. Although, the colored fine particles were dispersed in chloroform and sonicated for 60 minutes, no polymerizable anthraquinone dye was extracted with the chloroform at all.

In a similar manner to that of Example 1, a liquid crystal display was made by using the colored fine particles as the spacer. A scanning voltage was applied to the display device and the displaying characteristics were observed. The device gave a high-quality display which little suffered from flicker and was excellent in contrast.

Example 6

Seed polymerization was conducted in the same manner as that of Example 4 except that 80 parts of divinylbenzene, 20 parts of methyl methacrylate and 6.0 parts of polymerizable anthraquinone dye F were used as the monomers. Red fine particles were obtained, which had a mean particle diameter of 7.1 μm, a coefficient of variation of 2.9% and a 10% modulus in compression of 320 kg/mm² (on an average).

The observation of the colored fine particles thus prepared under a microscope of 400 magnifications revealed that they were colored intensely and had high light shielding properties. Although, the colored fine particles were dispersed in chloroform and sonicated for 60 minutes, no polymerizable anthraquinone dye was extracted with the chloroform at all.

In a similar manner to that of Example 1, a liquid crystal display was made by using the colored fine particles as the spacer. A scanning voltage was applied to the display device and the displaying characteristics were observed. The device gave a high-quality display which little suffered from flicker and was excellent in contrast.

Example 7

Seed polymerization was conducted in the same manner as that of Example 1 except that polymerizable anthraquinone dyes B, C and F were used each in an amount of 5.0 parts and that 5.0 parts of t-butyl peroxy-2-ethylhexanoate ("Perbutyl O", a product of Nippon Oil and Fats Co., Ltd.) was used as the polymerization initiator. Black fine particles were obtained, which had a mean particle diameter of 6.6 μm, a coefficient of variation of 3.2% and a 10% modulus in compression of 340 kg/mm² (on an average).

The observation of the colored fine particles thus prepared under a microscope of 400 magnifications revealed that they were colored intensely and had high light shielding properties. Although the colored fine particles were dispersed in chloroform and sonicated for 60 minutes, no polymerizable anthraquinone dye was extracted with the chloroform at all.

In a similar manner to that of Example 1, a liquid crystal display was made by using the colored fine particles as the spacer. A scanning voltage was applied to the display device and the displaying characteristics were observed. The device gave a high-quality display which little suffered from flicker and was excellent in contrast.

Example 8

Suspension polymerization was conducted in the same manner as that of Example 3 except that 90 parts of divinylbenzene, 20 parts of styrene, 4.0 parts of polymerizable anthraquinone dye A, 4.0 parts of polymerizable anthraquinone dye D and 4.0 parts of polymerizable anthraquinone dye F were used as the monomers and that t-hexyl peroxy-2-ethylhexanoate ("Perhexyl O", a product of Nippon Oil and Fats Co., Ltd.) was used as the polymerization initiator. After the completion of the polymerization, the reaction mixture was filtered, and the particles thus recovered were washed and classified to give dark-purple fine particles having a mean particle diameter of 7.5 μm, a coefficient of variation of 6.1% and a 10% modulus in compression of 320 kg/mm² (on an average).

The observation of the colored fine particles thus prepared under a microscope of 400 magnifications revealed that they were colored intensely and had high light shielding properties. Although the colored fine particles were dispersed in chloroform and sonicated for 60 minutes, no polymerizable anthraquinone dye was extracted with the chloroform at all.

In a similar manner to that of Example 1, a liquid crystal display was made by using the colored fine particles as the spacer. A scanning voltage was applied to the display device and the displaying characteristics were observed. The device gave a high-quality display which little suffered from flicker and was excellent in contrast.

In Examples 1 to 8, the crosslinking monomer contents were 58.9%, 69.1%, 75.3%, 88.3%, 87.3%, 61.1%, 60.7%, and 63.0%, respectively.

Comparative Example 1

Seed polymerization was conducted in the same manner as that of Example 1 except that 9.0 parts of 1,4-di (butylamino)anthraquinone was used instead of the polymerizable anthraquinone dye A. Blue fine particles were obtained, which had a mean particle diameter of 6.2 μm, a coefficient of variation of 3.1% and a 10% modulus in compression of 270 kg/mm² (on an average).

When the obtained colored fine particles were dispersed in chloroform and sonicated, the chloroform turned blue, which indicates that the dye was extracted from the particles. When the particles were subjected to repeated ultrasonic washing with chloroform, the blue fine particles were faded to result in pale-blue ones. Furthermore, the observation of the resulting particles under a microscope of 400 magnifications revealed that they little exhibited light shielding properties.

In a similar manner to that of Example 1, a liquid crystal display was made by using the colored fine particles as the spacer. A scanning voltage was applied to the display device and the displaying characteristics were observed. The device gave a display suffering from flicker and being poor in contrast.

Comparative Example 2

Suspension polymerization was conducted in the same manner as that of Example 3 except that 3.0 parts of 1,4-di(methylamino)anthraquinone, 3.0 parts of 1-amino-4-hydroxyanthraquinone and 3.0 parts of 1,4-dihydroxy-anthraquinone were used instead of the polymerizable anthraquinone dye C and that t-hexyl peroxy-2-ethyl-hexanoate "Perhexyl O", a product of Nippon Oil and Fats Co., Ltd.) was used as the polymerization initiator. After the completion of the polymerization, the reaction mixture was filtered and the particles thus recovered were washed and classified to give dark-brown fine particles having a mean particle diameter of 7.5 μm, a coefficient of variation of 5.9% and a 10% modulus in compression of 250 kg/mm² (on an average).

When the obtained colored fine particles were dispersed in chloroform and sonicated, the chloroform turned reddish orange, which indicates that the dye was extracted from the particles. When the particles were subjected to repeated ultrasonic cleaning with chloroform, the particles were faded to result in light-brown ones. Furthermore, the observation of the resulting particles under a microscope of 400 magnifications revealed that they little exhibited light shielding properties.

In a similar manner to that of Example 1, a liquid crystal display was made by using the colored fine particles as the spacer. A scanning voltage was applied to the display device and the displaying characteristics were observed. The device gave a display suffering from flicker and being poor in contrast.

We claim:

1. A liquid crystal display constituted of a pair of substrates which are each equipped with transparent electrodes and an orientation film and face each other with a spacer between them, wherein said spacer is composed of colored fine particles prepared by copolymerizing a polymerizable anthraquinone dye having at least one ethylenically unsaturated bond in the molecule with an ethylenically unsaturated monomer component in an aqueous medium.

2. A liquid crystal display according to claim 1, wherein the polymerizable anthraquinone dye is a product of reaction of an oil-soluble anthraquinone dye having at least one member selected from the group consisting of hydroxyl, amino and monoalkylamino groups in the molecule with an ethylenically unsaturated carboxylic acid chloride.

3. A liquid crystal display according to claim 1, wherein the polymerizable anthraquinone dye is a product of reaction of an oil-soluble anthraquinone dye having at least one member selected from the group consisting of hydroxyl, amino, monoalkylamino and carboxyl groups in the molecule with an ethylenically unsaturated epoxy compound.

4. A liquid crystal display according to claim 1, wherein the polymerizable anthraquinone dye is a product of reaction of an oil-soluble anthraquinone dye having at least one member selected from the group consisting of hydroxyl, amino, monoalkylamino and carboxyl groups in the molecule with an ethylenically unsaturated isocyanate compound.

5. A liquid crystal display according to claim 1, wherein the polymerizable anthraquinone dye is a product of reaction of an oil-soluble anthraquinone dye represented by the general formula (I) with an ethylenically unsaturated methylol compound:

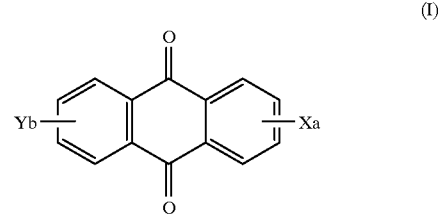

(I)

wherein X and Y are each —OH; a is an integer of 2 to 4; and b is an integer of 0 to 4 (with the proviso that a and b must satisfy the relationship: $a+b \leq 7$).

6. A liquid crystal display according to claim 1, wherein the colored fine particles are those prepared by simultaneously using two or more polymerizable anthraquinone dyes each having at least one ethylenically unsaturated bond in the molecule.

7. A liquid crystal display according to claim 1, wherein the polymerizable anthraquinone dye is one having two or more ethylenically unsaturated bonds.

8. A spacer for a liquid crystal display composed of colored fine particles prepared by copolymerizing a polymerizable anthraquinone dye having at least one ethylenically unsaturated bond in the molecule with an ethylenically unsaturated monomer component in an aqueous medium, wherein the ethylenically unsaturated monomer component is one containing a crosslinking monomer in an amount of 30% by weight or above based on the whole monomers.

* * * * *